US007825057B2

(12) United States Patent
Kwon et al.

(10) Patent No.: US 7,825,057 B2
(45) Date of Patent: Nov. 2, 2010

(54) METHOD FOR PREPARING THE MIXED ELECTRODE CATALYST MATERIALS FOR A PEM FUEL CELL

(75) Inventors: Nak Hyun Kwon, Seoul (KR); Yung Eun Sung, Gyeonggi-do (KR); In Su Park, Gwangju (KR); Yong Hun Cho, Gyeonggi-do (KR); In Chul Hwang, Gyeonggi-do (KR); Il Hee Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 441 days.

(21) Appl. No.: 11/985,810

(22) Filed: Nov. 16, 2007

(65) Prior Publication Data
US 2009/0005237 A1    Jan. 1, 2009

(30) Foreign Application Priority Data
Jun. 26, 2007    (KR) .................... 10-2007-0063045

(51) Int. Cl.
| B01J 23/40 | (2006.01) |
| B01J 23/74 | (2006.01) |
| B01J 23/00 | (2006.01) |
| B01J 23/42 | (2006.01) |
| B01J 23/44 | (2006.01) |
| C22C 5/04 | (2006.01) |
| C22C 30/00 | (2006.01) |
| H01M 4/88 | (2006.01) |
| H01M 4/00 | (2006.01) |

(52) U.S. Cl. .................. 502/101; 502/185; 502/325; 502/339; 420/461; 420/462; 420/466; 420/580; 429/40; 429/41; 429/42; 429/43; 429/44

(58) Field of Classification Search .............. 502/101, 502/185, 325, 339; 420/461, 462, 466, 580; 429/40–44
See application file for complete search history.

(56) References Cited

U.S. PATENT DOCUMENTS 3,506,494 A  *  4/1970  Adlhart .................... 429/13

(Continued)

FOREIGN PATENT DOCUMENTS

JP    2004-344775    * 12/2004

(Continued)

OTHER PUBLICATIONS

"Complexed sol-gel synthesis of improved Pt-Ru-Os-based anode electro-catalysts for direct methanol fuel cells," Yousef M. Alyousef et al. Journal of Physics and Chemistry of Solids 70 (2009), pp. 1019-1023.*

*Primary Examiner*—Patricia L Hailey
(74) *Attorney, Agent, or Firm*—Edwards Angell Palmer & Dodge LLP; Peter F. Corless

(57) ABSTRACT

The present invention relates to a process for preparing electrode catalyst materials for a polymer electrolyte membrane fuel cell (PEMFC), and particularly to a high-performance platinum-non-platinum mixed electrode catalyst (Pt—RuOs/C) having a physically mixed structure of RuOs alloy and platinum materials, which is prepared by adding a small amount of platinum (Pt) to RuOs alloy materials highly dispersed on a carbon support, where the amount of platinum used is drastically reduced as compared to the conventional platinum materials, thus lowering the manufacturing cost.

7 Claims, 3 Drawing Sheets

U.S. PATENT DOCUMENTS

| | | | | | |
|---|---|---|---|---|---|
| 5,208,207 | A | * | 5/1993 | Stonehart et al. | 502/339 |
| 5,856,036 | A | * | 1/1999 | Smotkin et al. | 429/40 |
| 6,007,934 | A | * | 12/1999 | Auer et al. | 429/44 |
| 6,066,410 | A | * | 5/2000 | Auer et al. | 429/40 |
| 6,284,402 | B1 | * | 9/2001 | Mallouk et al. | 429/40 |
| 6,916,764 | B2 | * | 7/2005 | Choi et al. | 502/326 |
| 7,074,318 | B1 | * | 7/2006 | Chu et al. | 205/775 |
| 2007/0122683 | A1 | * | 5/2007 | Alexandrovichserov et al. | 429/40 |

FOREIGN PATENT DOCUMENTS

| | | | |
|---|---|---|---|
| JP | 2006-134774 | * | 5/2006 |
| JP | 2009-009924 | * | 1/2009 |
| KR | 10-2000-0034808 | | 6/2000 |
| KR | 10-2002-0063394 | * | 8/2002 |
| KR | 10-2000-0034808 | * | 10/2002 |
| KR | 10-2006-0082595 | * | 7/2006 |
| KR | 10-2006-0097588 | * | 9/2006 |
| WO | 98/40161 | * | 9/1998 |

* cited by examiner

METHOD FOR PREPARING THE MIXED ELECTRODE CATALYST MATERIALS FOR A PEM FUEL CELL

CROSS-REFERENCE TO RELATED APPLICATION

This application claims the benefit under 35 U.S.C. §119(a) of Korean Patent Application No. 10-2007-0063045, filed on Jun. 26, 2007, the entire contents of which are incorporated herein by reference.

TECHNICAL FIELD

The present invention relates to a process for preparing electrode catalyst materials for a fuel cell, and more particularly to a process for preparing electrode catalyst materials that may be used for a hydrogen oxidation electrode and a reduction electrode in a polymer electrolyte membrane fuel cell (PEMFC).

BACKGROUND ART

A fuel cell is a device that generates electrical energy by electrochemical conversion of the chemical energy of fuel instead of burning it into heat. This is an electric generator without a pollution problem and thus has drawn much attention recently.

Fuel cells generate electricity by electrochemically reacting fuel with oxygen; They can supply electric power for various electric/electronic consumer goods, particularly mobile devices as well as for industry, home and vehicles.

Fuel cells may be divided into a solid electrolyte fuel cell, a phosphoric acid fuel cell and a molten carbonate fuel cell depending on the type of electrolyte. Running temperature of fuel cells and materials consisting of the electrolyte may be determined by properties of the electrolyte.

Solid-type PEM fuel cells have been most widely studied as a power source for a vehicle. In PEMFCs, hydrogen and oxygen gases are provided to an oxidation electrode and a reduction electrode, respectively, which generates a current by the following reactions:

Oxidation electrode reaction: $2H_2 \rightarrow 4H^+ + 4e^-$

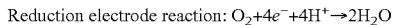
Reduction electrode reaction: $O_2 + 4e^- + 4H^+ \rightarrow 2H_2O$

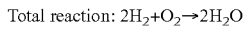
Total reaction: $2H_2 + O_2 \rightarrow 2H_2O$

As shown above, a hydrogen molecule is decomposed, and four hydrogen ions and four electrons are produced in the oxidation electrode. Thus produced electrons move through an outer circuit, thereby generating a current. The hydrogen ions move to the reduction electrode through electrolyte, and participate in the reduction electrode reaction. Obviously, the efficiency of a fuel cell largely depends on the electrode reaction rate.

Electrodes include catalysts. The majority of the electrode catalyst materials are platinum-based metals, which are very expensive and cause the manufacturing cost to increase. It has been reported that the usage of platinum should be lowered to 0.2 g per kW for commercialization of a fuel cell vehicle.

For this purpose, there have been many attempts made to develop non-platinum materials. However, thus developed non-platinum catalyst materials fail to show excellent performance for practical uses, and thus there is still an urgent need for the development of high-performance electrode catalyst materials that can overcome the aforementioned problems.

The information disclosed in this Background Art section is only for enhancement of understanding of the background of the invention and should not be taken as an acknowledgement or any form of suggestion that this information forms the prior art that is already known to a person skilled in the art.

SUMMARY OF THE INVENTION

To accomplish the aforementioned purpose, the present invention aims to provide a process for preparing high-performance mixed electrode catalyst materials having a mixed structure of RuOs alloy and platinum, which is prepared by adding platinum (Pt) to RuOs alloy materials consisting of highly dispersed crystallized nanoparticles, thus decreasing the amount of platinum and lowering the cost for production of electrode catalysts and fuel cells.

The present inventors have exerted extensive researches and finally found that high-performance catalyst materials may be prepared by adding a small amount of platinum materials to non-platinum materials with catalytic activity. They have prepared mixed electrode catalyst materials by using RuOs alloy material and platinum and confirmed that the mixed electrode catalyst materials have satisfactory electrochemical activities, thus finally completing the present invention.

More particularly, to achieve the aforementioned objective, the present invention provides a process for preparing electrode catalyst for solid electrolyte fuel cell, which comprises the steps of: (a) dispersing in water RuOs alloy of highly dispersed crystallized nanoparticles, purging a nitrogen gas to remove unnecessary gases, and introducing a hydrogen gas as a reducing agent; (b) adding, while the hydrogen gas is being introduced, a platinum precursor solution to the RuOs alloy-dispersed solution, and continuing the introduction of the hydrogen gas for 1 hour after the addition of the platinum precursor is completed; and (c) washing and drying the resultant solution to obtain a powdered material.

According to an embodiment, the RuOs alloy nanoparticles are highly dispersed on carbon surface.

According to another embodiment, the RuOs alloy is preferably used in the amount of 0.01-0.5 g relative to 400 mL of water.

According to yet another embodiment, the nitrogen is preferred to be purged for from 10 minutes to 1 hour after the RuOs alloy is dispersed in water.

According to still another embodiment, the platinum precursor is preferred to be $K_2PtCl_4$.

According to a further embodiment, the platinum is preferably used in the amount of 1-40 wt % relative to the total weight of RuOs alloy.

According to a still further embodiment, the platinum precursor is preferred to be added at a rate of 0.01-1.0 mg/min.

BRIEF DESCRIPTION OF DRAWINGS

The above and other features of the present invention will be described with reference to certain exemplary embodiments thereof illustrated the attached drawings in which.

DETAILED DESCRIPTION

Figure 1:
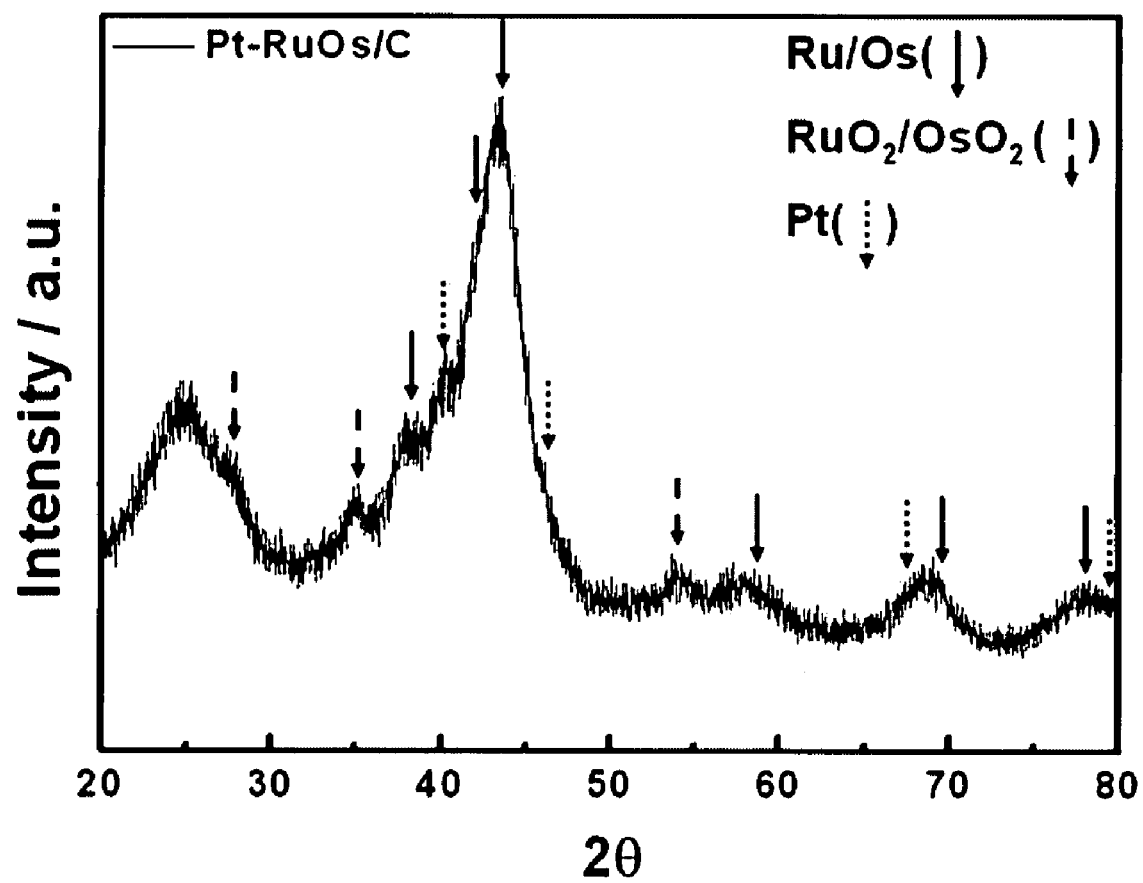
FIG. 1 shows a XRD result of a mixed electrode catalyst materials according an embodiment of the present invention.

The present invention relates to a process for preparing mixed electrode catalyst materials for a solid electrolyte fuel cell, particularly to a mixed electrode catalyst having a physically mixed structure of RuOs alloy and a small amount of platinum that may be applied to both a hydrogen oxidation electrode and a reduction electrode.

Mixed materials for electrode catalyst prepared in the present invention contain two or more phases that are physically mixed with each other, and they are different from materials that contain two or more elements alloyed.

In particular, the present invention relates to electrode catalyst materials, which can be prepared by adding a small amount of platinum to RuOs alloy materials highly dispersed on carbon (RuOs/C). The electrode catalyst materials may overcome the prior art problems of high production cost in using platinum materials and relatively low catalytic activity of non-platinum materials, thus being useful in preparing an electrode catalyst for a fuel cell in a vehicle.

The electrode catalyst materials according to the present invention comprise crystallized RuOs alloy materials highly dispersed on carbon powders (RuOs/C) and pure platinum materials. After preparing the highly-dispersed RuOs alloy materials (RuOs/C), platinum is dispersed onto carbon surface where RuOs nanoparticles are dispersed.

Mixed electrode catalyst materials for a solid electrolyte fuel cell, where RuOs alloy particles physically contact platinum particles, can be prepared by the process which comprises the steps of: (i) dispersing in a solvent RuOs alloy nanoparticles highly dispersed on carbon (RuOs/C); (ii) adding a platinum precursor solution while introducing a gas; (iii) reducing the platinum precursor by using hydrogen reduction method; and (iv) performing washing and drying to prepare powdered materials.

In a preferred embodiment, water, preferably deionized (DI) water, may be used as the solvent. RuOs alloy materials highly dispersed on carbon surface (RuOs/C) is well dispersed in DI water by sonication.

The amount of RuOs alloy materials is preferred to be 0.01-0.5 g relative to 400 mL of water. When the amount is less than 0.01 g, the concentration of RuOs alloy materials dispersed in water solvent is so low that platinum (Pt) atom, which is to be reduced in a subsequent reduction step, is too far away to make bonds with RuOs nanoparticles, resulting in free platinum. When the amount is more than 0.5 g, carbon black may not be well dispersed in a solvent.

After the dispersing process, a nitrogen gas is purged for from 10 minutes to 1 hour to remove unnecessary gases. When the process is conducted for less than 10 minutes, gases such as oxygen dissolved at room temperature may not be completely removed. When the process is conducted for more than 1 hour, the synthesis may take relatively longer, thereby lowering the efficiency in synthesis.

A pure hydrogen gas is then introduced. While the introduction of pure hydrogen gas being performed, a platinum precursor solution is added by using a syringe pump. A preferable example of platinum precursor is $K_2PtCl_4$.

The amount of the added platinum (Pt) is preferred to be 1-40 wt % relative to the total weight of RuOs alloy materials. When the amount is less than 1 wt %, active surface per the total volume of catalyst materials decreases, and when applied to a device, the volume of a device may increase. When the amount is more than 40 wt % the efficiency in a mixed structure of RuOs alloy and the added platinum may decrease.

Platinum precursor ($K_2PtCl_4$) is preferred to be injected at a rate of 0.01-1.0 mg/min with a syringe pump. When the rate is lower than 0.01 mg/min, the synthesis of the materials may take relatively longer time, thus decreasing the synthesis efficiency. When the rate is higher than 1.0 mg/min, some of the injected platinum precursor may remain unreduced because the injection rate is higher than the reduction rate.

Upon completion of the introduction of a platinum precursor solution, an additional hydrogen gas is introduced for 1 hour. Thereafter, the resultant solution is washed and dried under 70° C. air condition, thereby providing powdered mixed electrode catalyst materials.

The present invention is described more specifically by the following Examples. Examples herein are meant only to illustrate the present invention, but they should not be construed as limiting the scope of the claimed invention.

Various changes and modifications may be made in carrying out the present invention without departing from the spirit and scope thereof. Insofar as these changes and modifications are within the purview of the appended claims, they are to be considered as part of the present invention.

Example AND COMPARATIVE EXAMPLE

As an Example, a mixed electrode catalyst with a mixed structure of RuOs alloy and platinum was prepared as described below.

40 wt % of RuOs(1:1)/C (0.1 g) was well dispersed in 400 mL of deionized (DI) water. After a nitrogen gas was introduced for 30 minutes, a hydrogen gas was introduced. 0.0236 g of platinum precursor, i.e. $K_2PtCl_4$, was dissolved in 15 mL of DI water, and injected with a syringe pump at a rate of 0.02 mL/minute while a hydrogen gas is being introduced. The introduction of hydrogen gas continues for about 1 hour after the addition of the precursor solution was completed. Washing and drying processes were conducted to obtain electrode materials with a mixed structure.

As a Comparative Example, commercially available 40 wt % Pt/C [J&M] was used.

FIG. 1 is a XRD result that shows the structural feature of the material prepared in Example. From this result, it was confirmed that the mixed catalyst contains small amounts of oxides of Ru and Os in addition to Pt and RuOs alloy materials. Peaks near 40° show the existence of platinum materials. Accordingly, this XRD result confirms that a mixed electrode catalyst materials according to an embodiment of the present invention has a structure where Pt and RuOs alloy materials are physically well admixed with small amounts of oxides of Ru and Os.

Figure 2:
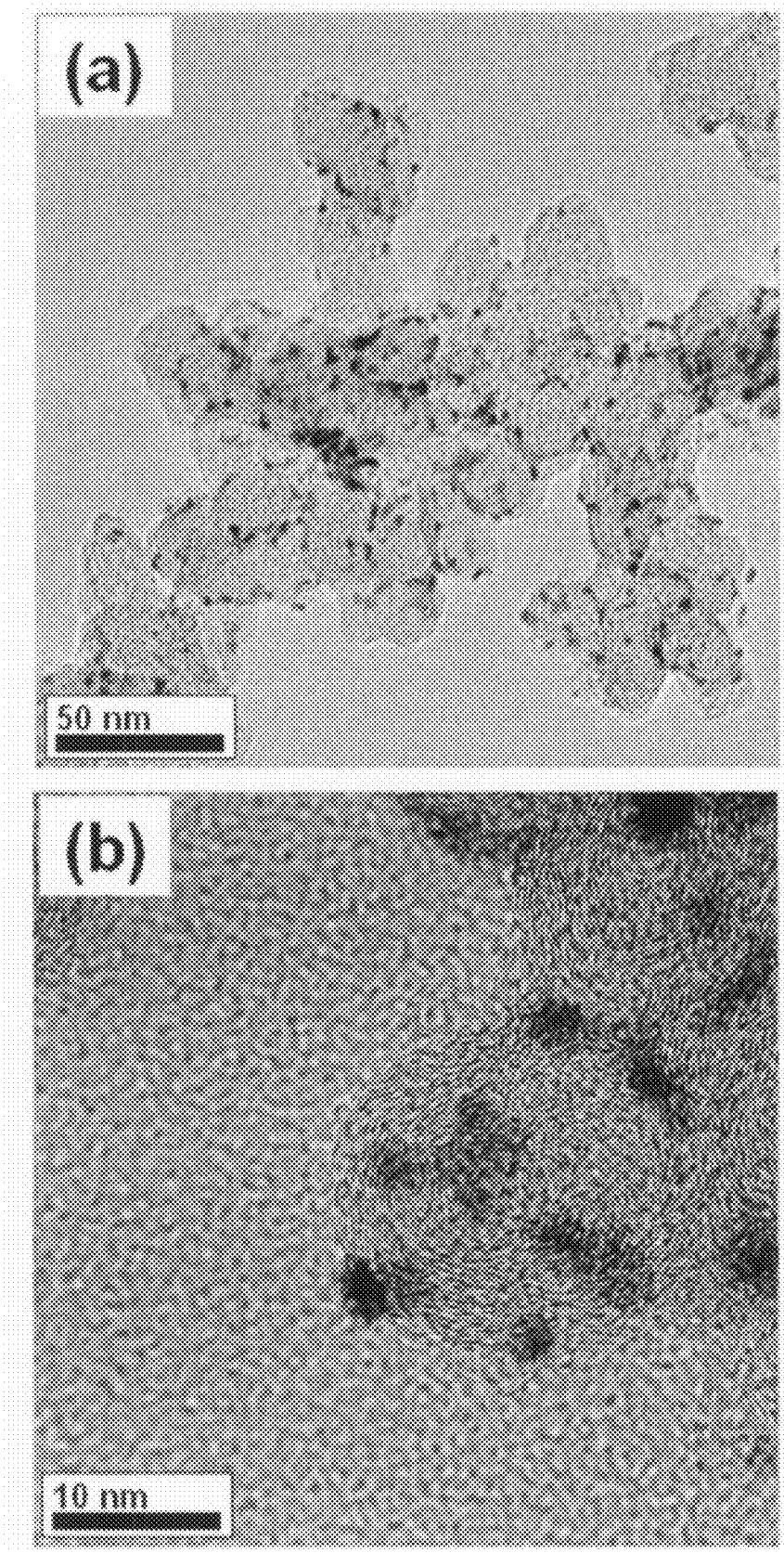
FIG. 2 (which includes FIG. 2(*a*) and Figure (b)) is a TEM image of a mixed electrode catalyst materials according to an embodiment of the present invention.

TEM image (FIG. 2 (which includes FIG. 2(a) and FIG. (b)) also shows dispersed nanoparticles. Accordingly, particles, which were prepared by continuous reduction of Pt, were also confirmed to have nanoscale structure although platinum particles may not be distinguished from RuOs alloy particles in the TEM image.

Figure 3:
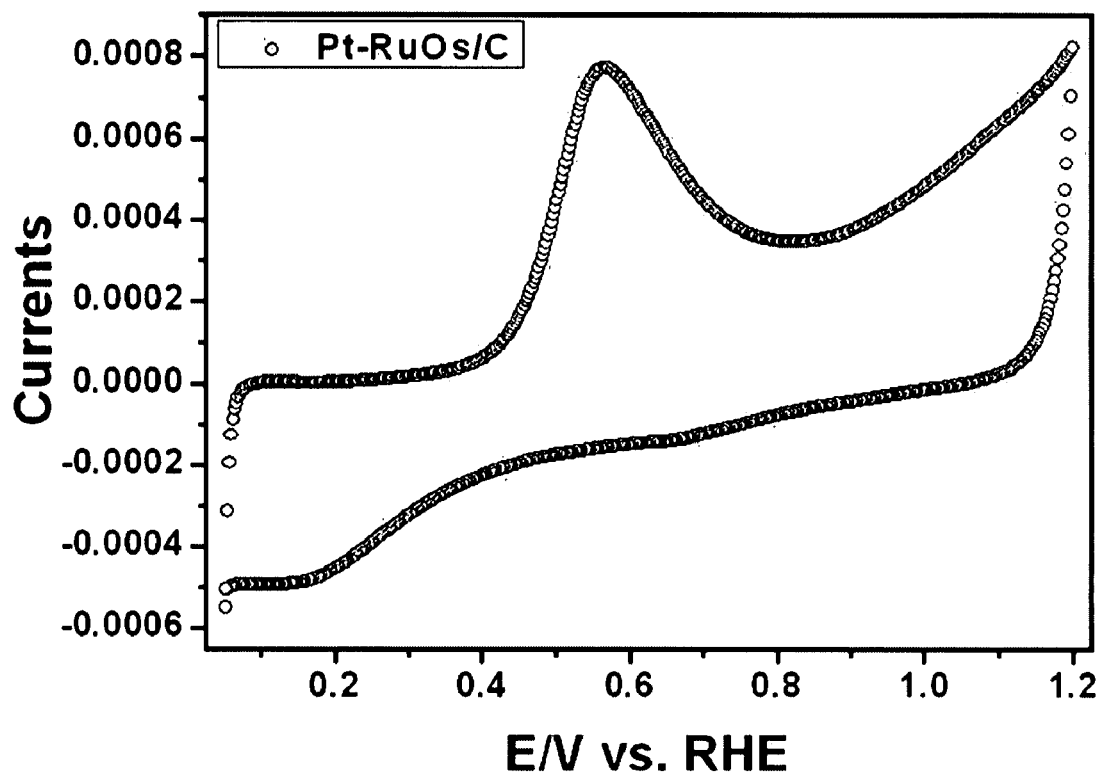
FIG. 3 shows a CO stripping result of a mixed electrode catalyst materials according to an embodiment of the present invention.

FIG. 3 shows the behavior of CO that is desorbed from platinum atom of a mixed electrode catalyst materials. This result is different from that of pure platinum in that the peak of CO stripping (0.55 V vs. RHE) is lower than that of pure platinum. Relatively high symmetry of the peak shows that the platinum has a uniform surface structure mixed with RuOs alloy materials.

Experimental Example

Electrodes were prepared by using materials of the aforementioned Example and Comparative Example. Electrochemical activity to hydrogen oxidation was evaluated as described below.

For the evaluation of electrochemical activity, MEA was prepared according to CCM method by directly spraying catalyst ink onto polymer electrolyte Nafion 112. The amount of the catalyst used was controlled to 0.2 mg/cm$^2$.

Figure 4:
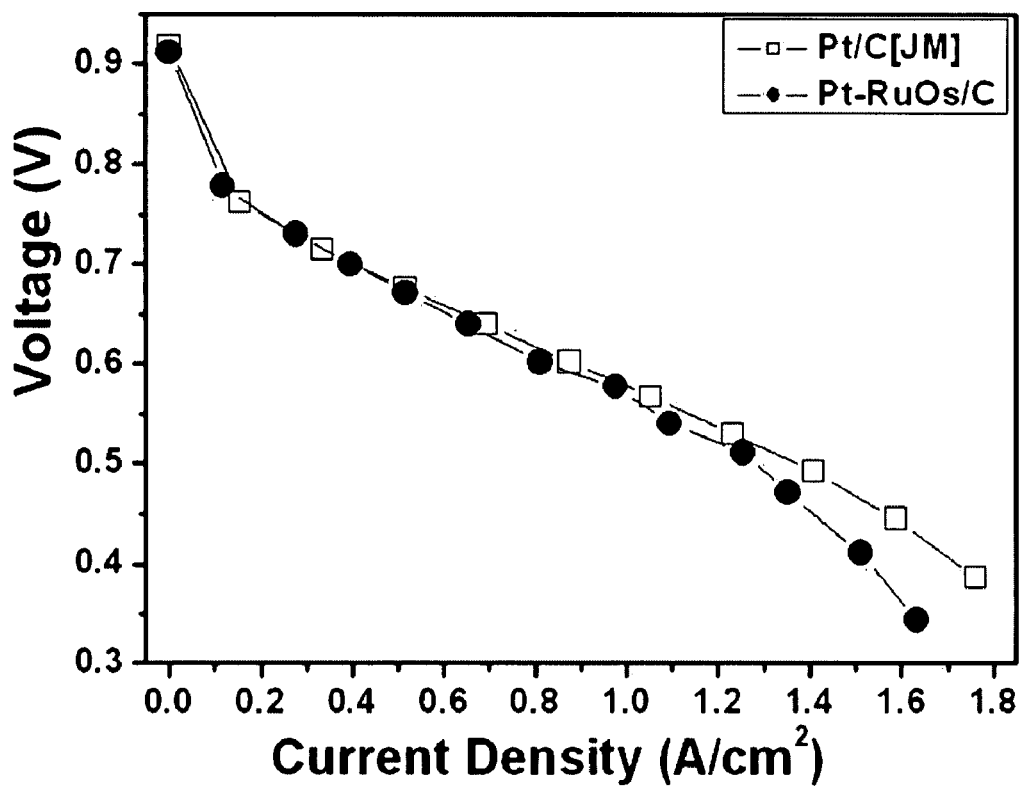
FIG. 4 is the analysis of catalyst activity that shows hydrogen oxidation behavior of a mixed electrode catalyst materials according to an embodiment of the present invention.

As shown in FIG. 4, I-V curve was obtained by using hydrogen and air at the cell temperature of 70° C., and a hydrogen gas and air were humidified at 70° C. and 75° C., respectively. At the voltage of higher than 0.65 V, Example and Comparative Example show similar behaviors, while Example shows relatively lower activity than Comparative Example at the voltage of lower than 0.65 V. More specifically, at the voltage of 0.6 V, Comparative Example [40 wt % Pt/C(J&M)] is 850 mA/cm$^2$ whereas Example [Pt—RuOs/C] is 800 mA/cm$^2$.

Considering that a less amount of Pt was used in Example than in Comparative Example, it is confirmed that Example shows relatively higher activity than Comparative Example. This activity amounts to higher than 90% of that of pure platinum materials, which is an appropriate level for accomplishing the object of the present invention.

As described above, there is disclosed a high-performance platinum-non-platinum mixed electrode catalyst (Pt—RuOs/C) having a physically mixed structure of RuOs alloy and platinum materials, which is prepared by adding a small amount of platinum (Pt) to RuOs alloy materials highly dispersed on a carbon support, where the amount of platinum used may be drastically reduced as compared to the conventional platinum materials, thus lowering the manufacturing cost.

A high-performance mixed electrode catalyst material herein overcomes both the high production cost of platinum materials and the relatively lower activity of non-platinum materials, and may be usefully used as a hydrogen oxidation electrode and a reduction electrode for fuel cell vehicle.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A process for preparing an electrode catalyst material for a polymer electrolyte membrane fuel cell comprising:
    (a) dispersing in water RuOs alloy of highly dispersed crystallized nanoparticles, purging a nitrogen gas to remove unnecessary gases, and introducing a hydrogen gas as a reducing agent;
    (b) adding, while the hydrogen gas is being introduced, a platinum precursor solution to the RuOs alloy-dispersed solution, and continuing the introduction of the hydrogen gas for 1 hour after the addition of the platinum precursor is completed; and
    (c) washing and drying the resultant solution to obtain a powdered material.

2. The process of claim 1, wherein said RuOs alloy is characterized in that RuOs alloy nanoparticles are highly dispersed on carbon surface.

3. The process of claim 1, wherein said RuOs alloy is used in the amount of 0.01-0.5 g relative to 400 mL of water.

4. The process of claim 1, wherein said nitrogen gas is purged for from 10 minutes to 1 hour after the RuOs alloy is dispersed in water.

5. The process of claim 1, wherein said platinum precursor is $K_2PtCl_4$.

6. The process of claim 1, wherein said platinum is used in the amount of 1-40 wt % relative to the total weight of RuOs alloy.

7. The process of claim 1, wherein said platinum precursor is added at a rate of 0.01-1.0 mg/min.

* * * * *